United States Patent [19]
Shuholm et al.

[11] Patent Number: 5,923,710
[45] Date of Patent: Jul. 13, 1999

[54] SYNCHRONOUS SWITCHING OF DIGITAL AUDIO WHILE MAINTAINING BLOCK ALIGNMENT

[75] Inventors: Kevin J. Shuholm, Grass Valley; Joey L. Rainbolt, Rough & Ready, both of Calif.

[73] Assignee: Tektronix, Inc., Wilsonville, Oreg.

[21] Appl. No.: 08/795,213

[22] Filed: Feb. 5, 1997

[51] Int. Cl.$^6$ .................................................. H04K 1/10
[52] U.S. Cl. ........................................ 375/260; 375/354
[58] Field of Search ..................... 375/260, 354, 375/314, 359; 370/100.1, 105.1, 105.4; 371/42, 46, 69

[56] References Cited

U.S. PATENT DOCUMENTS

| | | | |
|---|---|---|---|
| 5,134,636 | 7/1992 | Barucchi et al. | 375/106 |
| 5,451,942 | 9/1995 | Beard et al. | 341/50 |
| 5,592,398 | 1/1997 | Terauchi et al. | 360/33.1 |

*Primary Examiner*—Stephen Chin
*Attorney, Agent, or Firm*—Francis I. Gray

[57] ABSTRACT

A system and method for synchronous switching of digital audio data channels while maintaining block alignment between the switched digital audio signals at an output separates status and user bits from audio data and validity bits for each digital audio signal, storing the status and user bits in respective memories for each digital audio data channel. The audio data and validity bits for each digital audio data channel are input via a data first-in, first-out buffer to an audio multiplexer. The status and user bits from the memories for each digital audio data channel are read out by a system clock in synchronization with a system block signal and input to a status/user multiplexer. A selector provides control signals to the multiplexers to select the digital audio data channel to provide to an output transmitter. The status and user bits are combined with the audio data and validity bits in the output transmitter in synchronization with the system block start signal to provide a digital audio signal output that maintains block alignment between the switched digital audio signals at the output.

6 Claims, 3 Drawing Sheets

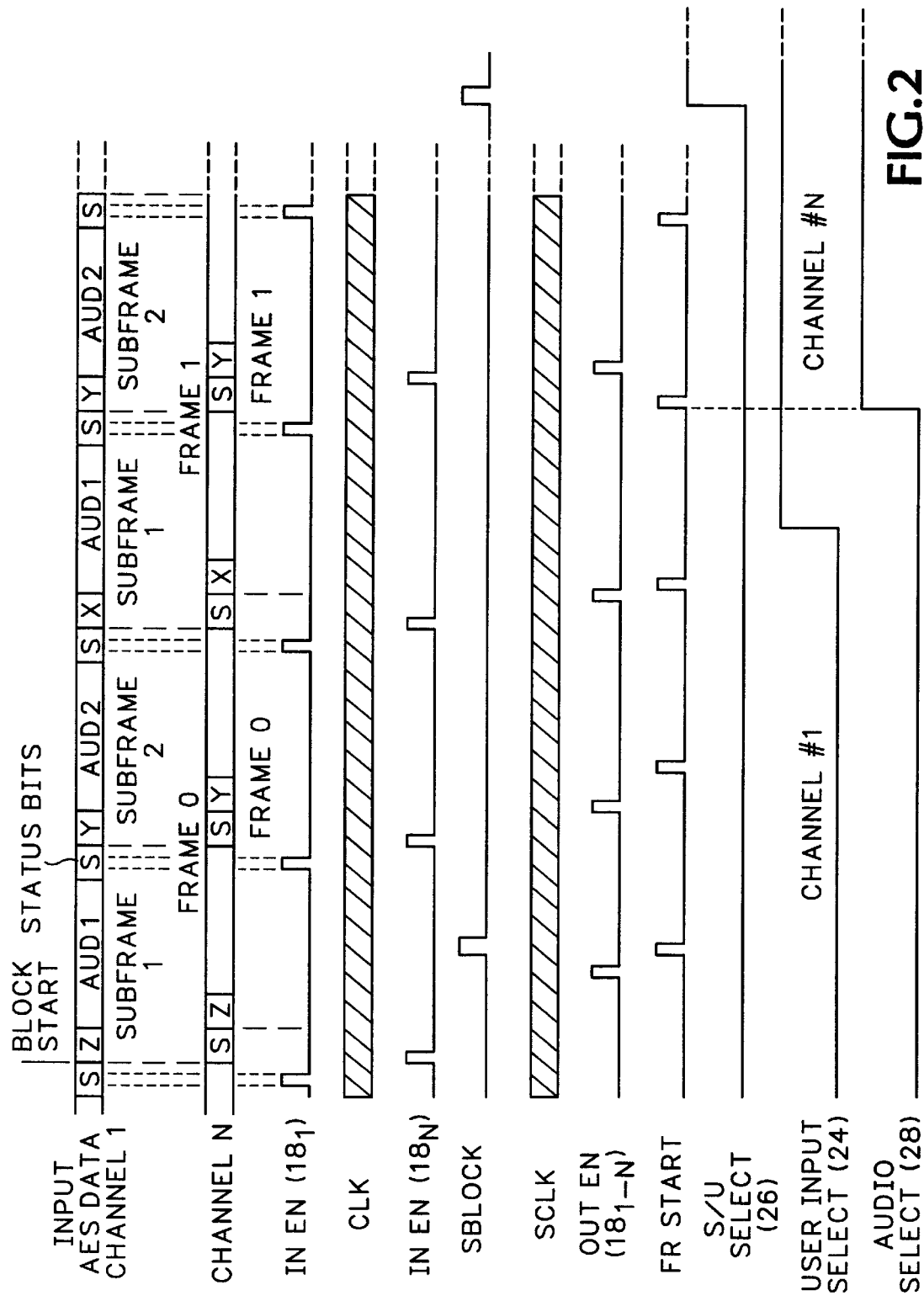

SYNCHRONOUS SWITCHING OF DIGITAL AUDIO WHILE MAINTAINING BLOCK ALIGNMENT

BACKGROUND OF THE INVENTION

The present invention relates to digital audio signals, and more particularly to synchronous switching of digital audio data channels while maintaining block alignment between the switched digital audio signals at the output.

An internationally known standard for the interchange of digital audio is AES3-1992. Under this standard two channels of audio are digitized and then time multiplexed into a single serial digital data stream. This stream contains certain synchronizing symbols (X, Y), or preambles, that are used by a receiver of the stream to demultiplex and deserialize the two digital audio channels. In addition to the digitized audio samples, each channel within the stream also contains auxiliary information in the form of a channel status bit (C), a user data bit (U), a validity bit (V) and a parity bit (P). The validity and parity bits only pertain to the samples in which they are contained, but the channel status and user data bits form blocks of data which span 192 samples each. A special preamble (Z) in place of the X preamble in the AES stream indicates the start of a new 192 sample block.

A problem exists when it is necessary to switch between two AES streams. Current methods of synchronous switching of AES signals only do frame alignment on the signals, not block alignment. If the block timing at the output is interrupted, downstream equipment may experience a brief failure, possibly in the form of the receiver not being able to recover the AES signal for a short period of time. This dropout of the AES signal results in unwanted pops, clicks or muting. One method of circumventing this problem is to discard the auxiliary information, storing only the audio sample data in first-in, first-out (FIFO) buffers and switching between the FIFOs, and create new auxiliary information on the output by reformatting in an AES encoder so that the block alignment at the output never changes. However this method completely loses the original auxiliary information.

What is desired is a method of synchronous switching of digital audio data channels while maintaining block alignment between the switched digital audio signals at the output without losing the original auxiliary Information.

SUMMARY OF THE INVENTION

Accordingly the present invention provides synchronous switching of digital audio data channels while maintaining block alignment between the switched digital audio signals at the output without losing the original auxiliary information by separating status and user bits from audio data in the digital audio signals for each channel and storing such status and user bits in auxiliary first-in, first-out (FIFO) buffers. The audio data from each channel are input to an audio multiplexer via respective data FIFOs, and the stored status and user bits from each auxiliary FIFO are input to a status/user multiplexer in sychronization with a system block start signal. A selector in response to a user input select signal provides control signals to the multiplexers to select for output the audio data and status and user bits for the selected channel, the status and user bits commencing with the system block start signal. The selected audio data, status and user bits are Input to an audio data transmitter/encoder and formatted to provide the selected channel digital audio signal output with block alignment with the previously selected digital audio signal.

The objects, novelty and other advantages of the present invention are apparent from the following detailed description when read in conjunction with the appended claims and attached drawing.

BRIEF DESCRIPTION OF THE DRAWING

FIG. 2 is a timing diagram for the system of FIGS. 1A and 1B according to the present invention.

DESCRIPTION OF THE PREFERRED EMBODIMENT

Figure 1A:
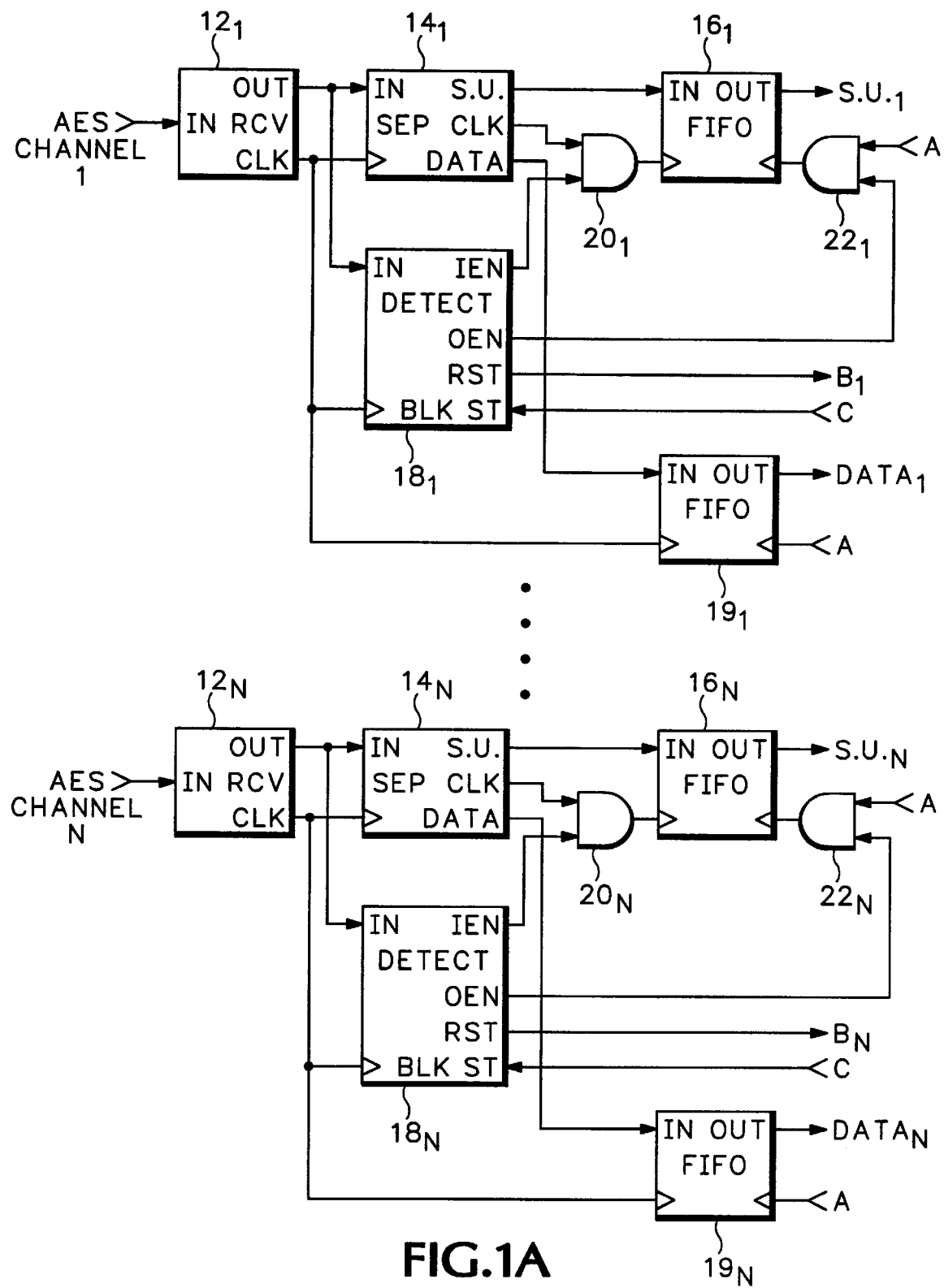
FIGS. 1A and 1B are a block diagram view of a system for synchronous switching of digital audio data channels while maintaining block alignment between the switched digital audio signals according to the present invention.
Figure 1B:
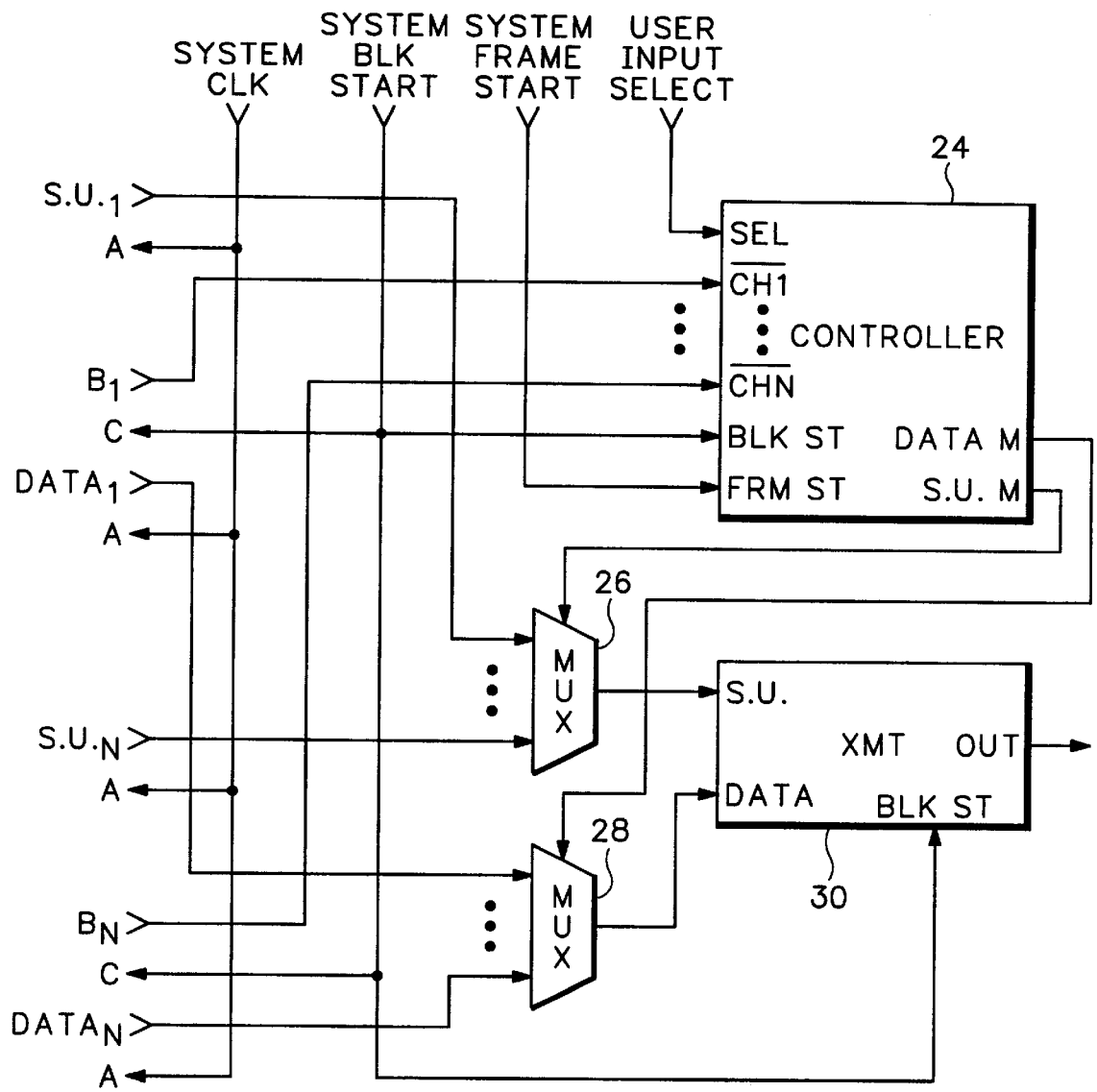

Referring now to FIGS. 1A and 1B AES digital audio signals are input to respective digital audio data channels 1 through N, each of which includes an AES receiver 12 that provides a deserialized digital audio data output and a recovered clock output. A data separator 14 receives the deserialized digital audio data and the recovered clock and provides a status/user bits output, an audio data/validity bits output and a clock output. The separated status/user bits are input to an auxiliary first-in, first-out (FIFO) memory 16 which is at least one audio block in length, i.e., 384 bits divided 192 bits for status and 192 bits for user. The deserialized digital audio data and the recovered clock are input to a data FIFO 19 and to a block start detector 18. The block start detector 18 provides an input enable signal derived from the status bits (C, U) for the auxiliary FIFO 16, a reset output derived from the Z preamble, and an output enable signal for the auxiliary FIFO. The input enable signal from the block start detector 18 and the clock signal from the separator 14 are input via an AND gate 20 to an input clock terminal of the auxiliary FIFO 16 to clock the status/user bits into the auxiliary FIFO when enabled. The output enable signal from the block start detector 18 and a system status/user clock signal are input via another AND gate 22 to an output clock terminal of the auxiliary FIFO 16 to clock the status/user bits out of the auxiliary FIFO when enabled. The audio data is clocked into the data FIFO 19 in response to the recovered clock from the receiver 12 and clocked out in response to a system clock.

A selector 24 receives a system block start signal, which also is applied to the block start detector 18 to generate the output enable signal. The selector 24 also receives a user input select signal and the reset signal from the block start detector 18 for each digital audio data channel between which switching is desired. The selector 24 provides two output multiplexer control signals, a status/user control signal that is derived from the system block start signal and an audio control signal that is derived from the user select signal and a system frame signal. A status/user multiplexer 26 is controlled by the status/user control signal and has as inputs the outputs from the auxiliary FIFOs 16 for each digital audio data channel between which switching is desired. Likewise a data multiplexer 28 is controlled by the audio control signal and has as inputs the deserialized digital audio data/validity bits from the respective data FIFOs 19. The outputs from the multiplexers 26, 28 are input to respective inputs of an AES transmitter/encoder 30, which also has the system block start signal as an input, to provide an output AES digital audio signal that includes the audio data as well as the original status and user bits.

In operation referring to FIG. 2 the User Select Input indicates that channel #1 is selected, so that the output from the channel 1 auxiliary FIFO $16_1$ is selected by the status/user multiplexer 26 for input to the SU input of the AES transmitter/encoder 30 and the audio sample data and validity bit output from the channel 1 data FIFO $19_1$ is selected by the audio multiplexer 28 for input to the audio input of the AES transmitter/encoder. The AES transmitter/encoder 30 starts each new block of the output AES data stream with receipt of the System Block Start signal, generating a Z preamble for the first subframe and alternating X,Y preambles for subsequent subframes in the block. The output from the channel 1 auxiliary FIFO 161 is inserted into the appropriate status and user bit locations of the output AES data stream since for the channel 1 auxiliary FIFO the System Block Start signal generates the output enable signal. When the User Input Select signal indicates a switch to another channel N, the select signal for the status/user multiplexer 26 switches after receipt of the next System Block Start signal, while the audio multiplexer 28 switches immediately. The audio inputs to the AES transmitter/encoder 30 are taken from the channel N data FIFO $19_n$ at the next system frame start, while the status/user bits are taken from the channel N auxiliary FIFO $16_n$ once the System Block Start Signal has been received. As a result the newly selected channel auxiliary data starts at the System Block Start signal, as did the previously selected channel, and the auxiliary bits from the input AES data streams are inserted into the correct locations vis a vis the start of the audio data block so that the output AES auxiliary data is identical to the selected input AES auxiliary data, the only difference being a time delay depending upon the difference in time between the block start preambles of the input AES data streams and the System Block Start signal.

Thus the present invention provides synchronous switching of digital audio data channels while maintaining block alignment between the switched digital audio signals by extracting and storing for each channel starting with the block preamble the status/user bits in a FIFO, and reading out the status/user bits from the FIFO in synchronization with a System Block Start signal for reformatting with the audio data in an AES transmitter/encoder, the switching for the status/user bits occurring upon the System Block Start signal that occurs immediately after the new channel selection is made.

What is claimed is:

1. A system for synchronous switching between digital audio data channels comprising:

for each digital audio data channel means for separating auxiliary data bits from audio data in a digital audio signal input organized in blocks of data;

for each digital audio data channel means for storing the separated auxiliary data bits; and means for switching between selected ones of the digital audio data channels by switching between the auxiliary data bits from the selected digital audio data channels based upon a system block start signal and a user input select signal and between the audio data from the selected digital audio data channels based upon the user input select signal and a system frame start signal related to the system block start signal to provide an output digital audio signal that maintains block alignment for the auxiliary data bits when switching between the selected digital audio data channels.

2. The system as recited in claim 1 wherein the separating means comprises:

for each digital audio data channel means for extracting a clock signal from the digital audio signal input; and a separator having as inputs the clock signal and the digital audio signal input and providing as outputs the clock signal, the auxiliary data bits and the audio data.

3. The system as recited in claim 2 wherein the storing means comprises:

means for generating an input enable signal from the digital audio signal input; and a first-in, first-out (FIFO) buffer that is clocked by the clock signal when enabled by the input enable signal to store the auxiliary data bits.

4. The system as recited in claim 3 wherein the switching means comprises:

a selector controller having as inputs the user input select signal for changing from one audio channel to another, the system block start signal and the system frame start signal and providing as outputs an auxiliary select signal in response to the system block start signal and the user input select signal and an audio select signal in response to the user input select signal and the system frame start signal; and means having as inputs the auxiliary data bits from each digital audio data channel and the audio data from each digital audio channel for selecting one of the digital audio channels as the digital audio output in response to the auxiliary and audio select signals.

5. The system as recited in claim 4 wherein the selecting means comprises:

an auxiliary multiplexer having as inputs the auxiliary data bits from the digital audio data channels that are clocked out from the FIFO buffer in response to a system clock and an output enable signal derived from the system block start signal, and being controlled by the auxiliary select signal to provide the auxiliary data bits at the output from the digital audio data channel indicated by the user input select signal;

an audio multiplexer having as inputs the audio data from the digital audio data channels and being controlled by the audio select signal to provide the audio data at the output from the digital audio data channel indicated by the user input select signal; and an audio transmitter/encoder having as inputs the outputs from the auxiliary and audio multiplexers and the system block start signal and providing as an output the digital audio signal indicated by the user input select signal.

6. A method of synchronous switching between digital audio data channels comprising the steps of:

separating for each digital audio data channel auxiliary data bits from audio data in a digital audio signal input organized in blocks of data;

storing the auxiliary data bits for each digital audio data channel; and switching between selected ones of the digital audio data channels by switching between the auxiliary data bits from the selected digital audio data channels in response to a system block start signal and a user input select signal and between the audio data from the selected digital audio data channels in response to the user input select signal and a system frame start signal to provide an output digital audio signal that maintains block alignment for the auxiliary data bits when switching between the selected digital audio data channels.

* * * * *